US010776356B2

United States Patent
Vandiver et al.

(10) Patent No.: US 10,776,356 B2
(45) Date of Patent: Sep. 15, 2020

(54) ASSIGNING NODES TO SHARDS BASED ON A FLOW GRAPH MODEL

(71) Applicant: HEWLETT PACKARD ENTERPRISE DEVELOPMENT LP, Houston, TX (US)

(72) Inventors: Benjamin M. Vandiver, Arlington, MA (US); Pratibha Rana, Waltham, MA (US); Pratyush Parimal, Cambridge, MA (US); Jason Michael Slaunwhite, Cambridge, MA (US); Eden Zik, Cambridge, MA (US); Shreya Prasad, Cambridge, MA (US); Seyed Amin Saeidi Nyasar, Cambridge, MA (US); Mark Edward Hayden, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 733 days.

(21) Appl. No.: 15/482,367

(22) Filed: Apr. 7, 2017

(65) Prior Publication Data

US 2018/0293274 A1      Oct. 11, 2018

(51) Int. Cl.
   *G06F 16/2453*    (2019.01)
   *G06F 16/901*    (2019.01)
(52) U.S. Cl.
   CPC .... *G06F 16/24542* (2019.01); *G06F 16/9024* (2019.01)

(58) Field of Classification Search
   CPC .................. G06F 16/24542; G06F 16/9024
   USPC ......................................................... 808/718
   See application file for complete search history.

(56) References Cited

U.S. PATENT DOCUMENTS

| 9,223,828 | B2 | 12/2015 | Weyerhaeuser et al. |
| 2004/0249939 | A1 | 12/2004 | Amini |
| 2009/0006447 | A1* | 1/2009 | Balmin ............... G06F 16/8373 |
| 2013/0290292 | A1 | 10/2013 | Weyerhaeuser et al. |
| 2013/0290957 | A1 | 10/2013 | Li et al. |
| 2018/0114132 | A1* | 4/2018 | Chen ................... G06F 12/0875 |

OTHER PUBLICATIONS

Hong, Bo, Prasanna, Victor.; "Adaptive Allocation of Independent Tasks to Maximize Throughput"; Published by IEEE online Jan. 9, 2007; IEEECS Log No. TPDS-0260-1004; Digital Object Identifier No. 10.1109/TPDS.2007.1042; U.S.; 16 pages.

* cited by examiner

*Primary Examiner* — Robert W Beausoliel, Jr.
*Assistant Examiner* — Pedro J Santos

(57) ABSTRACT

A technique includes modeling assignments of a plurality of nodes to a plurality of shards associated with a database operation based on a target throughput for the plurality of nodes. The modeling includes constraining the assignments based on an aggregate outflow from the plurality of nodes. The technique includes initializing the aggregate outflow to be less than the target throughput; and determining the assignments based on the modeling.

20 Claims, 7 Drawing Sheets

ASSIGNING NODES TO SHARDS BASED ON A FLOW GRAPH MODEL

BACKGROUND

A database system allows large volumes of data to be stored, managed and analyzed. Data records for a relational database system may be associated with tables. A table may include one or more rows, where each row may contain a set of related data (e.g., data related to a single entity). The data for the row may be arranged in a series of fields, or columns, where each column includes a particular type of data (e.g., type of characteristic of an entity). Processing nodes of the database system may process queries, which are inquires expressed in a specified format (e.g., a Structured Query Language (SQL) format), for such purposes as analyzing, searching and retrieving data.

DETAILED DESCRIPTION

Figure 1:
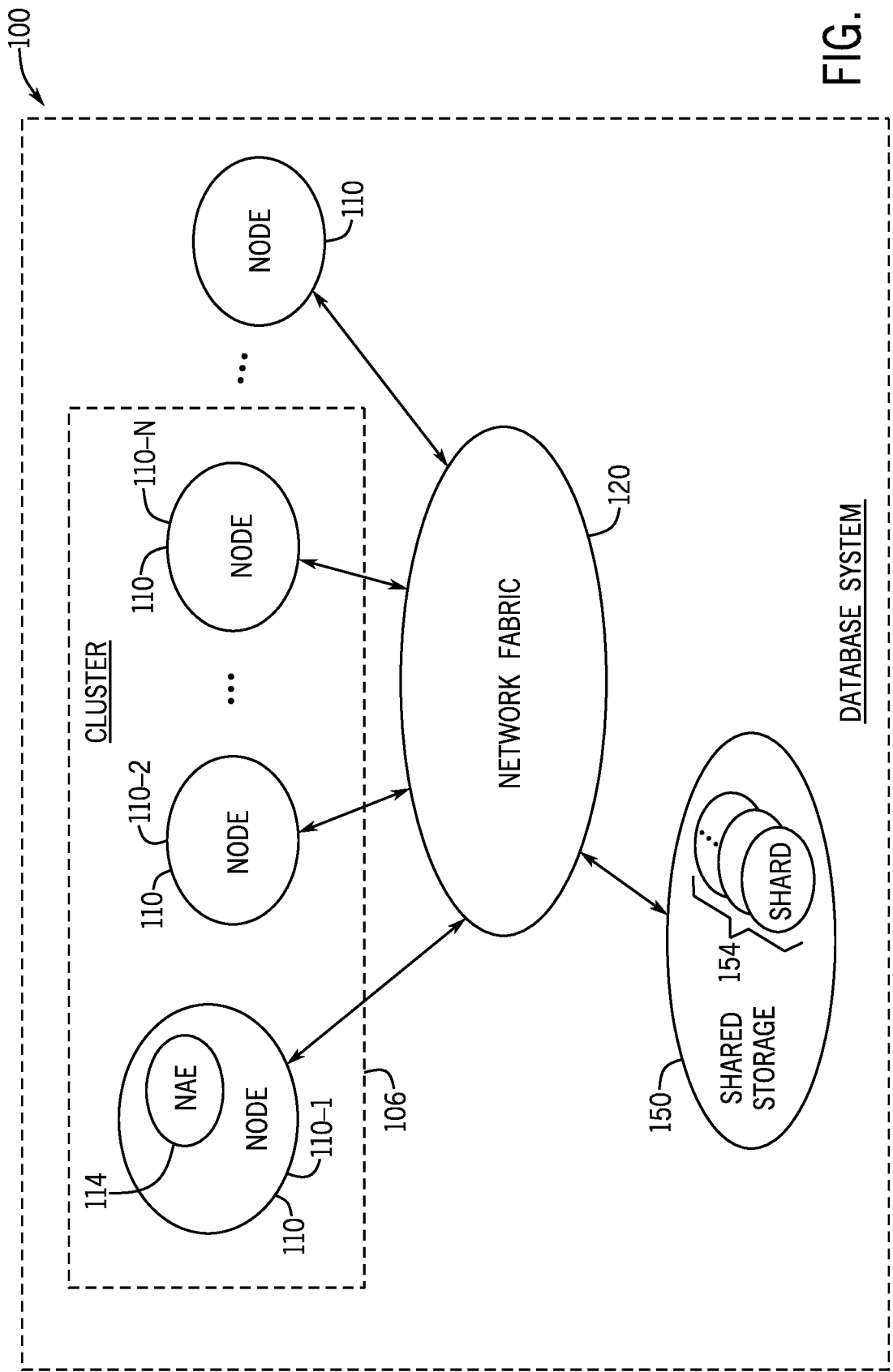
FIG. 1 is a schematic diagram of a database system according to an example implementation.

A distributed database system may have a relatively large number of nodes (over twenty nodes, for example) available to concurrently process queries and other database operations. In this manner, the distributed database system may be scalable, in that the number of concurrently active nodes and the grouping of the nodes into clusters (where each cluster of nodes collectively processes queries) may be dynamically selected based on the user load, or demand, that is placed on the system. In this context, a "node" refers to a physical machine, such as a physical machine containing a hardware processor (a central processing unit (CPU), one or multiple CPU cores, and so forth). As examples, the node may be a personal computer, a workstation, a server, a rack-mounted computer, a special purpose computer, and so forth.

In accordance with example implementations that are described herein, a database system may selectively assign a cluster of nodes to process queries for a given session. In this context, a "cluster" refers to a subset of a larger number of available nodes for query processing. For a fixed data volume and a query whose runtime is dominated by set up and tear down costs, adding additional participating nodes may slow down the query processing by adding more overhead. In accordance with example implementations that are described herein, a subset of nodes of a database system is selected to process a given database operation (a query, for example).

In accordance with example implementations, the database system may be a relational database system that includes multiple nodes and a shared storage, which stores objects that are accessed by the nodes. The objects may include "shards," where the shard is a data object that represents a horizontal partition of a table. In accordance with example implementations, a "shard" may be data that represents a single row of a table, an entire row of a table, a partial row of a table associated with selected columns, multiple rows of a table, multiple partial rows of a table, and so forth. Moreover, in accordance with example implementation, a given shard may be a row optimized container, which is a data unit representing one or multiple rows having one or multiple columns from a given table.

For a query that is directed to a set of shards (i.e., processing the query involves the use of the shards), the database system may merely assign a single node to serve to each shard, so that one node is assigned to each shard. However, for such reasons as fault tolerance and performance, it may be beneficial to assign multiple nodes to serve a given shard. Additionally, each node may be capable of concurrently processing a certain number of queries. In accordance with example implementations, an optimal selection of node-to-shard assignments is one that achieves a target aggregate query throughput (also called a "target throughput" herein), or desired production rate. In other words the optimal node-to-shard assignments for a given cluster yields a desired rate of production, such as the total number of queries processed by the cluster for a given unit of time, an amount of query data processed by the cluster for a given unit of time, and so forth.

In accordance with example implementations, the node-to-shard assignments may be selected based on a flow graph analysis in that the assignments are modeled by a flow graph model, and the assignments achieve an optimal or targeted query throughput. In the context of this application, a "flow graph model" refers to a model in which elements of the network, such as nodes and shards, are represented by corresponding vertices of a flow graph; data connections among the network elements are represented by edges that connect vertices; and the edges have associated capacities, which represent maximum flows that may occur through the corresponding data connections. The flow graph model, in accordance with example implementations, includes a source of the data (corresponding to a source vertex of the flow graph model) from which the data originates and a sink (corresponding to a sink vertex of the flow graph model). In accordance with example implementations, the flow graph model may be used in a flow graph analysis to determine characteristics of a network (such as, for example, node-to-shard assignments, i.e., which node or nodes serves a given shard) based on a targeted query throughput from the source to the sink. For example, in accordance with some implementations, the flow graph analysis may be a maximum flow graph analysis in which the flow graph model is used to determine network characteristics to maximize the flow of data from the source to the sink, such as assignments of nodes to shards that achieve a maximum query throughput.

Moreover, as described herein, in accordance with example implementations, the nodes are assigned to the shard in a manner that controls a skew of the assignments. In this manner, the "skew" refers to the uniformity of the node-to-shard assignment distribution, and controlling the skew may involve regulating the process to assign the nodes to the shards to limit the extent to which a given node may disproportionally serve a larger number of shards than the other nodes.

In accordance with example implementations, a node assignment engine of the database system assigns the nodes to the shards based on a network data flow graph model and a target query throughput. Moreover, the node assignment engine assigns the nodes to the shards in a manner that regulates (limits or minimizes, for example) the node-to-shard skew (if any). In accordance with example implementations, the node assignment engine may assign the nodes to the shards based on a maximum flow graph analysis-based model to achieve an optimal or targeted query throughput, while controlling or regulating the degree of node-to-shard skew for the assignments.

FIG. 1 depicts a distributed relational database system 100 in accordance with example implementations. Depending on the particular implementation, the database system 100 may be a public cloud-based system, a private cloud-based system, a hybrid-based system (i.e., a system that has public and private cloud components), a private system disposed on site, a private system geographically distributed over multiple locations, and so forth.

The database system 100 may be a scalable system, in accordance with example implementations. In this manner, in accordance with example implementations, the database system 100 includes processing resources (multiple nodes 110, which are described below) and/or storage resources (storage devices associated with the shared storage 150); and the processing resources may be scaled according to a user demand, or load, on the database system 100. The shared storage refers to multiple nodes 110 accessing or using the same data objects that are stored in the storage 150, such as shards 154. Pursuant to the scaling of the processing resources, the database system 100 may, in accordance with example implementations, selectively group the nodes 110 into clusters, such as an example cluster 106 of N nodes, which is depicted in FIG. 1.

In accordance with example implementations, each node 110 may include one or multiple personal computers, work stations, servers, rack-mounted computers, special purpose computers, and so forth. Depending on the particular implementation, the nodes 110 may be located at the same geographical location or may be located at multiple geographical locations. Moreover, in accordance with example implementations, multiple nodes 110 may be rack-mounted computers, such that sets of the nodes 110 may be installed in the same physical rack.

In accordance with example implementations, the nodes 110 may access the shared storage 150 through network fabric 120, and the nodes 110 may communicate with each other using the network fabric 120. In general, the network fabric 120 may include components and use protocols that are associated any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The shared storage 150 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the shared storage 150 may be located at the same geographical location or may be located at multiple geographical locations.

The nodes 110 collectively process queries for the cluster 106, and at any one time, the nodes 110 may be processing multiple queries in parallel. In general, the processing of a given query involves the nodes 110 accessing shards 154 that are served by the nodes 110, and the shard-the and with the shared storage 150 via network fabric 120. The shared storage 150, in turn, stores shards 154. A given query may involve the cluster 106 accessing a given set of shards 154.

For the example implementation of FIG. 1, a given node 110 includes a node assignment engine 114. It is noted that although the node assignment engine 114 is depicted as being located on one of the nodes 110, the node assignment engine 114 may be a distributed engine that is formed from multiple nodes 110, in accordance with further example implementations. Moreover, in accordance with further example implementations, the node assignment engine 114 may be located or implemented on a node that does not perform query processing or on a node 110 that is not part of the cluster.

Figure 2:
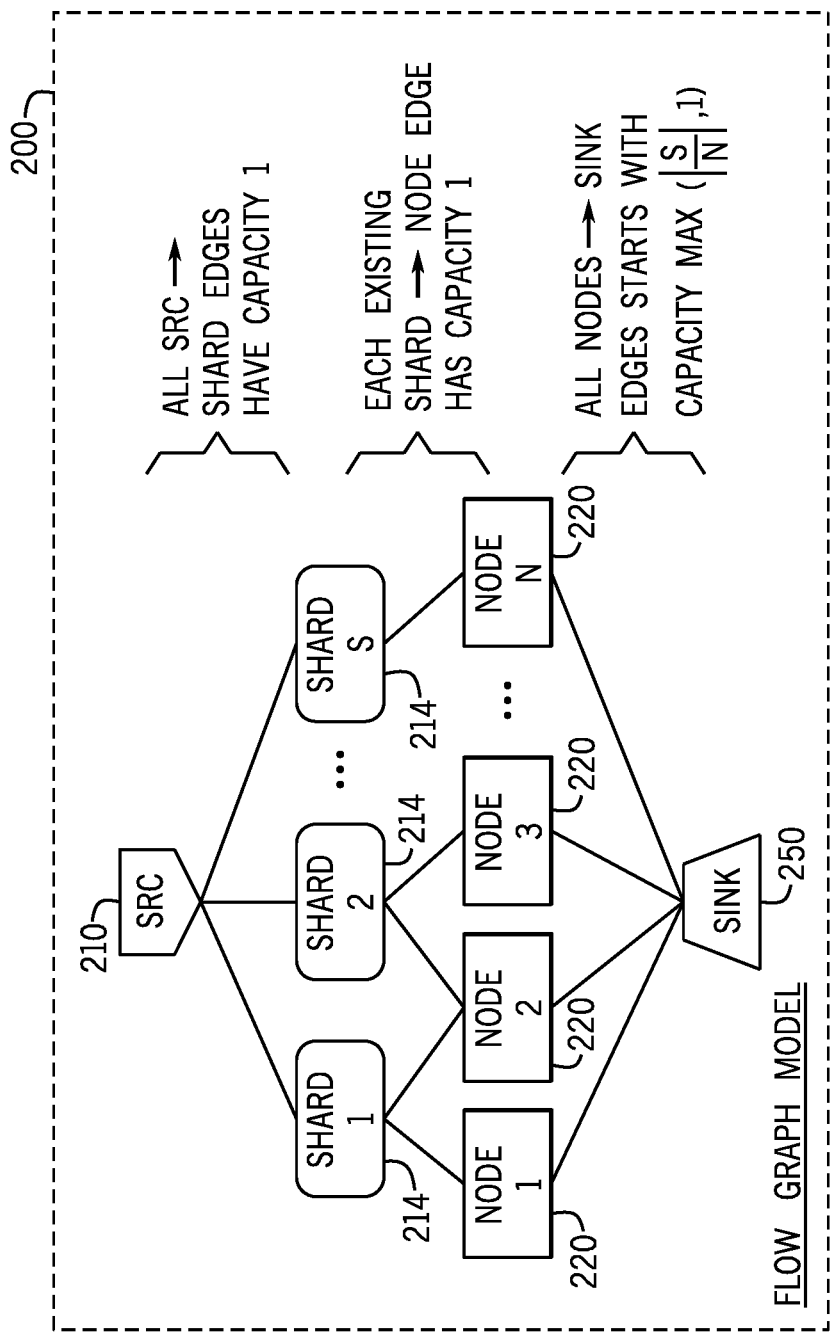
FIG. 2 is an illustration of a flow graph model according to an example implementation.

Referring to FIG. 2 in conjunction with FIG. 1, in accordance with some implementations, the node assignment engine 114 models the shard to node resource allocation task using a flow graph model 200. In accordance with example implementations, the modeling by the node assignment engine 114 may include the engine 114 applying a maximum flow graph analysis. The flow graph model 200 represents the shards 154 and nodes 110 as vertices: the flow graph model 200 contains S shard vertices 214 and N node vertices 220. The shard vertices 214 represent corresponding shards 154 that may be targeted by a database operation, and the node vertices 220 represent corresponding nodes that serve these shards 154 to process the database operation. The edges of the flow graph model 200 have corresponding capacities (throughputs), and the edges between the shard vertices 214 and node vertices 220 represent the node-to-shard assignments.

More specifically, in accordance with example implementations, the flow graph model 200 has a source vertex 210 (the source of all data flowing through the flow graph model 200) and a sink vertex 250 (the sink for all of the data). As depicted in FIG. 2, the flow graph model 200 has an edge between each shard vertex 214 and the source vertex 210, and each edge represents a flow capacity between the shard vertex 214 and the source vertex 210. In accordance with example implementations, the edges between the shard vertices 214 and the source vertex 210 have the same flow capacity of "1."

As depicted in FIG. 2, each shard vertex 214 is connected by one or multiple edges to one or more node vertices 220. In general, a given shard vertex 214 is connected to a given node vertex 220 to represent that the corresponding node 110 can serve the corresponding shard 154. The maximum throughput for the flow graph model 200 may be proportional to the number of shard vertices 214 (and shards). For example, as depicted in FIG. 2, in accordance with example implementations, the shard-to-node edges each have a flow capacity of "1." As such, the maximum throughput for the flow graph model 200 is "S," or the number of shard vertices 214. Additionally, as depicted in FIG. 2, in accordance with example implementations, each node vertex 210 has a single edge connected to the sink vertex 250.

The flow graph model 200 may be used, in accordance with example implementations, to determine the node-to-shard assignments, i.e., determine the edges connecting the shard vertices 214 and the node vertices 220. The node-to-shard assignments may be constrained, in accordance with example implementations, by an aggregate outflow, or output, from the node vertices 220, i.e., the assignments may be constrained by the sum, or total, or average, of the flow capacities represented by the edges between the node vertices 220 and the sink 250. As described herein, the "output" that is provided by the graph flow model 200 are the node-to-source assignments, and the "input" variable that may be manipulated is the aggregate outflow from the node vertices 220.

In accordance with example implementations, the node assignment engine 114 may constrain the flow graph model 200 with a particular aggregate outflow from the node vertices 220. This aggregate outflow may be, as described herein, as large as a target throughput for the flow graph model 200. For a maximum flow analysis, the target throughput may be the maximum flow for the model 200 and is equal to the number of shards 210, or S; and the aggregate outflow from the node vertices 220 may be equal to S or less than S.

In accordance with example implementations, the node assignment engine 114 uses the data flow model 200 in multiple passes, or iterations, to determine the node-to-shard assignments. In this manner, in accordance with example implementations, each iteration produces a set of node-to-shard assignments; and these node-to-shard assignments, in turn, initialize the flow graph model 200 for the next iteration (if any). Thus, the node-to-shard assignments may be progressively refined by the multiple iterations, with the last iteration providing the final set of node-to-shard assignments. In accordance with example implementations, the node assignment engine 114 varies the aggregate outflow from the node vertices 220 over the iterations, such that the flow graph model 200 is constrained with a different aggregate outflow from the nodes vertices 220 for each iteration. The modeling of the aggregate outflow in this manner may be used to control a distribution of the node-to-shard assignments, as further described herein.

More specifically, in accordance with example implementations, the node-to-sink edges have the same flow capacity; and in the initial iteration, the node assignment engine 114 initializes each node-to-sink edge with the following flow capacity: the maximum of the integer quotient of the number of shards (S) to number of nodes (N) and one, or $$\max\left(\left\lfloor \frac{S}{N} \right\rfloor, 1\right).$$

in many instances, the integer quotient of S/N may be less than the number of shards divided by the number of nodes; and accordingly, the aggregate outflow from the node vertices 220 may be less than the target data throughput, or S. Therefore, for the initial iteration, the aggregate outflow from the node-to-sink vertices is less than the target throughput S.

In accordance with example implementations, the node assignment engine 114 initializes the node-to-sink edges of the flow graph model 200 to have a flow capacity of $$\max\left(\left\lfloor \frac{S}{N} \right\rfloor, 1\right)$$

and performs a first iteration to determine a first set of node-to-shard assignments based on the flow graph model 200. For example, in accordance with some implementations, the node assignment engine 114 may apply a maximum flow analysis based on the flow graph model 200 to determine the optimal or targeted assignments. Thus, after the first iteration, the flow graph model 200, at this point, has node-to-shard assignments resulting from the initial iteration. The node assignment engine 114 may then increase the node-to-sink edge flow capacity of the flow graph model 200 and then perform another iteration to determine a second set of node-to-shard assignments based on the flow graph model 200, using the shard-to-node assignments from elections derived in the first iteration, repeats the optimum flow analysis for a second iteration. The flow graph model 200, at this point, has node-to-shard assignments resulting from the second iteration. In accordance with example implementations, the node assignment engine 114 may repeat this process for one or multiple additional iterations, with the shard-to-node assignments from the last iteration being the final assignments. The number of iterations and the increments by which the node assignment engine 114 varies the node-to-sink edge flow capacity from one iteration to the next may vary, depending on the particular implementation.

Figure 3:
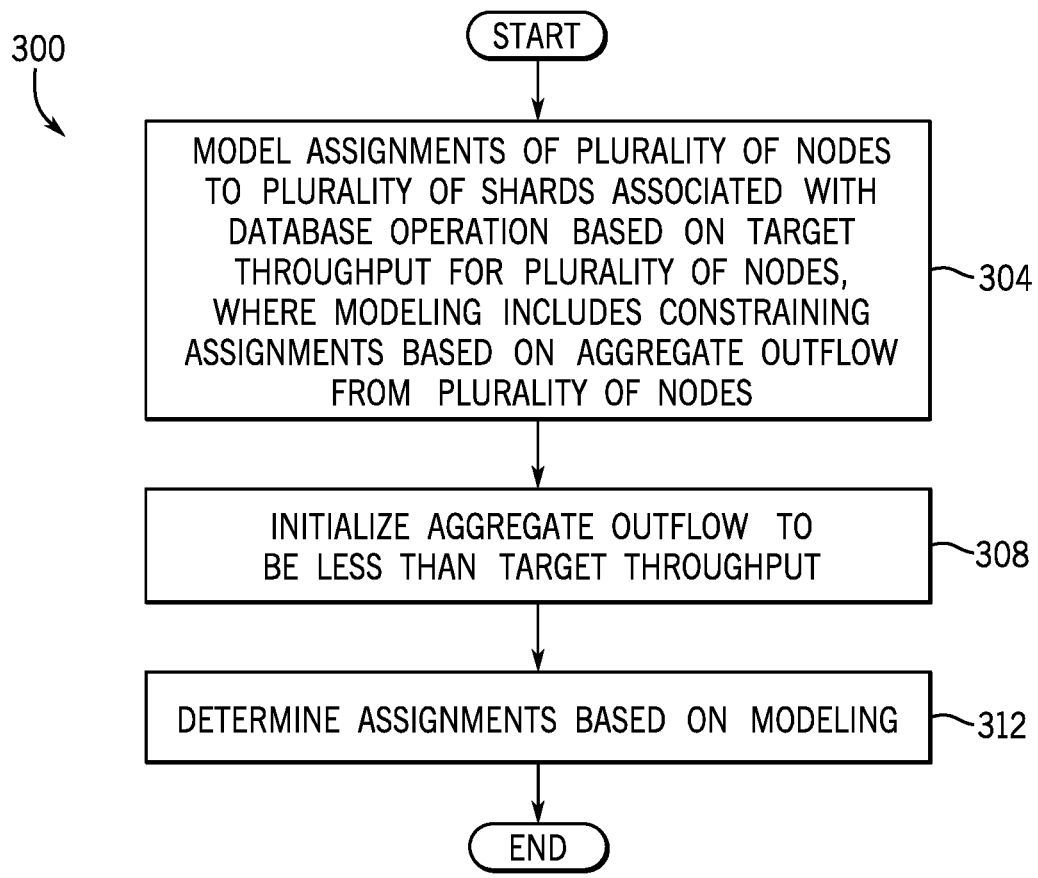
FIGS. 3, 4, 5 and 6 are flow diagrams depicting techniques to assign nodes to shards according to example implementations.

Thus, referring to FIG. 3 in conjunction with FIGS. 1 and 2, in accordance with example implementations, the node assignment engine 114 performs a technique 300 that includes, modeling (block 304) assignments of a plurality of nodes to a plurality of shards associated with a database operation based on a target throughput for the plurality of nodes. The modeling includes constraining the assignments based on an aggregate outflow from the plurality of nodes. The technique 300 includes initializing (block 308) the aggregate outflow to be less than the target throughput; and determining (block 312) the assignments based on the modeling.

The above-described approach to using multiple iterations to determine the node-to-shard assignments addresses the problem of the assignments otherwise being asymmetric, or skewed, leading to an aggregate outflow that is less than the number of shards 154 and resulting in an incomplete assignment of the shards 154 to the nodes 110. This imbalance is addressed, in accordance with example implementations, by the above-described manner of determining the node-to-shard assignments in multiple iterations, where the flow graph model 200, for at least one of these iterations, is constrained with an aggregate outflow that is less than the maximum or targeted throughput.

Figure 4:
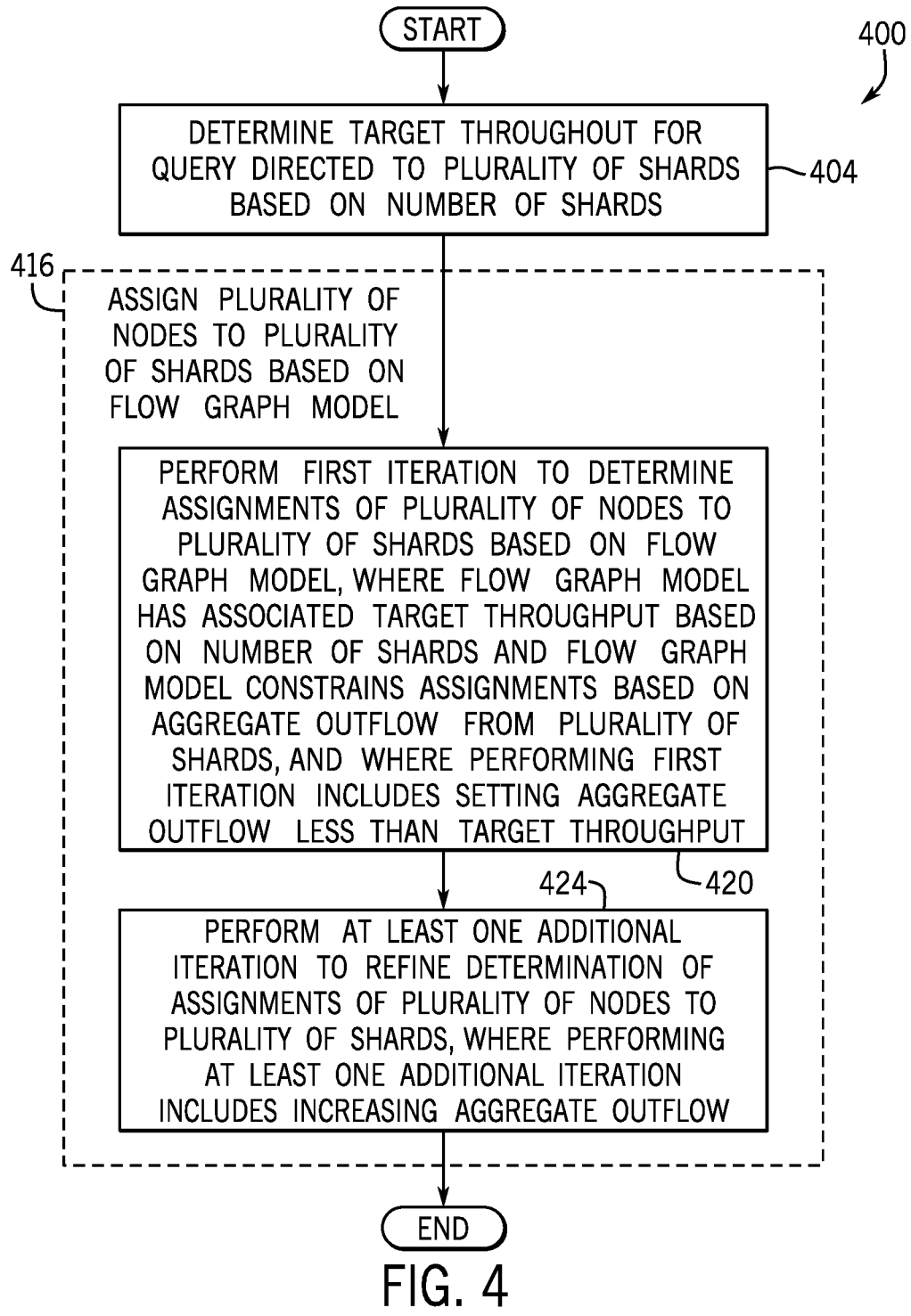

Thus, referring to FIG. 4 in conjunction with FIGS. 1 and 2, in accordance with example implementations, the node assignment engine 114 performs a technique 400 that includes determining (block 404) a target throughput for a query that is directed to a plurality of shards based on the number of the plurality of shards; and assigning (block 416) a plurality of nodes to a plurality of shards based on a flow graph model. The assignment of the nodes to the shards includes performing (block 420) a first iteration to determine assignments of the plurality of nodes to the plurality of shards based on a flow graph model. The flow graph model has an associated target throughput based on a number of the shards, and the flow graph model constrains the assignments based on an aggregate outflow from the plurality of shards. Performing the first iteration includes setting the aggregate outflow less than the target throughput. The technique 400 further includes performing (block 424) at least one additional iteration to refine the determination of the assignments of the plurality of nodes to the plurality of shards, where the performing includes increasing the aggregate outflow.

The node-to-shard assignments using the flow graph model 200 may be deterministic, i.e., the same input flow graph model may generate the same node-to-shard assignments. In accordance with example implementations, even usage of the shard-to-node mapping is promoted by varying the order in which the modeling creates the assignments, to thereby vary the output. For example, in accordance with some implementations, the order in which the node assignment engine 114 assigns the node-to-shard edges (i.e., the order in which the engine 114 performs the assignments) may be randomly or pseudo randomly generated. The result is a more even distribution of nodes 110 selected to serve shards 154, thereby increasing query throughput because the same nodes 110 are not "full" serving the same shards 154 for all queries.

In the context of this application, generating a "random" number means generating either a truly random number (a number derived from randomly occurring natural phenomena, such as thermal noise or antenna-generated noise, as examples) or a near random, or "pseudo random," number, which is machine generated. For example, a random number may be a generated by a seed-based generator that provides a pseudo random output. As a more specific example, the generator may be a polynomial-based generator, which provides an output that represents a pseudo random number, and the pseudo random number may be based on a seed value that serves as an input to a polynomial function. As examples, the seed value may be derived from a state or condition at the time the pseudo random number is generated, such as an input that is provided by a real time clock (RTC) value, a counter value, a register value, and so forth. In this manner, a polynomial-based generator may receive a seed value as an input, apply a polynomial function to the seed value and provide an output (digital data, for example), which represents a pseudo random number.

Figure 5:
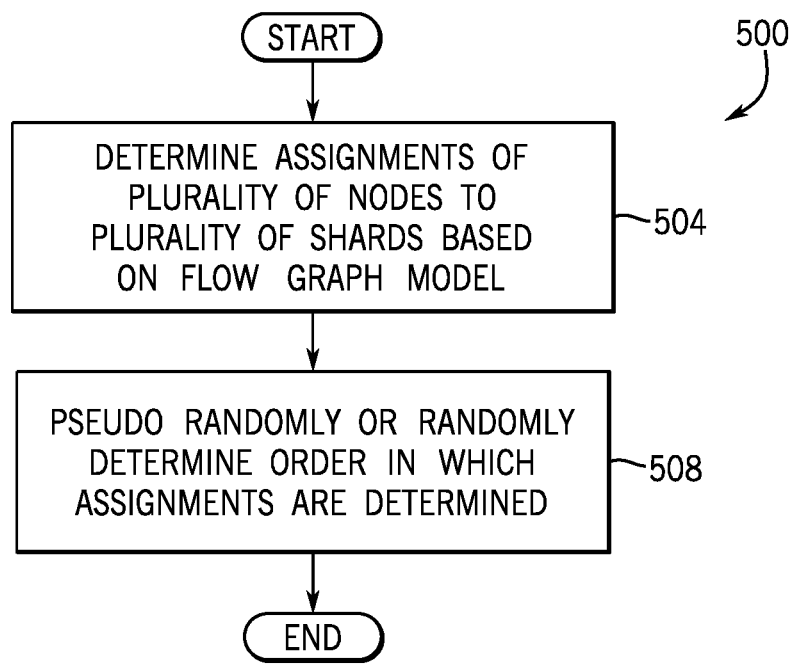

Thus, referring to FIG. 5 in conjunction with FIG. 1, in accordance with some implementations, the node assignment engine 114 may perform a technique 500 that includes determining (block 504) assignments of a plurality of nodes to a plurality of shards based on a flow graph model; and pseudo randomly or randomly determining (block 508) an order in which the assignments are determined.

In accordance with example implementations, certain nodes may be preferred for a given cluster 106. For example, in accordance with some implementations, certain nodes may be preferred based on the bandwidths associated with node-to-node communications. For example, nodes corresponding to computers that are deployed on the same rack may be preferred as opposed to, for example, constructing a cluster formed from nodes disposed on different racks, nodes disposed at different locations or across different networks, and so forth. As such, in accordance with example implementations, the node assignment engine 114 may prefer some nodes by prioritizing these nodes over others.

For example, in accordance with some implementations, the node assignment engine 114 may prefer, or prioritize, a node by assigning a non-zero flow capacity to the edge from the corresponding node vertex 220 to the sink vertex 250 for the first iteration (or one of the initial iterations, and general) of the node-to-shard assignment determination; and the node assignment engine 114 may, for a lower priority node, assign a zero flow capacity to the edge (i.e., omit the edge) from the corresponding node vertex 220 to the sink vertex for the first iteration (or one of the initial iterations, in general).

More specifically, in accordance with example implementations, in the first iteration, the node assignment engine 114 may assign edges between higher priority node vertices 220 (corresponding to higher priority nodes 110) and the sink vertex 250 and omit, or not assign, edges between relatively lower priority node vertices 220 (corresponding to relatively lower priority nodes 110). If the first iteration does not result in all of the target throughput being delivered by the higher priority node vertices 220, then the node assignment engine 114, in another iteration, may assign the next set of one or multiple edges from the node vertices 220 associated with the next priority level to the sink vertex 250 and perform another iteration.

In accordance with example implementations, the node assignment engine 114 may assign priorities to encourage node-to-shard assignments from nodes on the same rack, encouraging an assignment that avoids sending network data across bandwidth-constrained links, for example.

Figure 6:
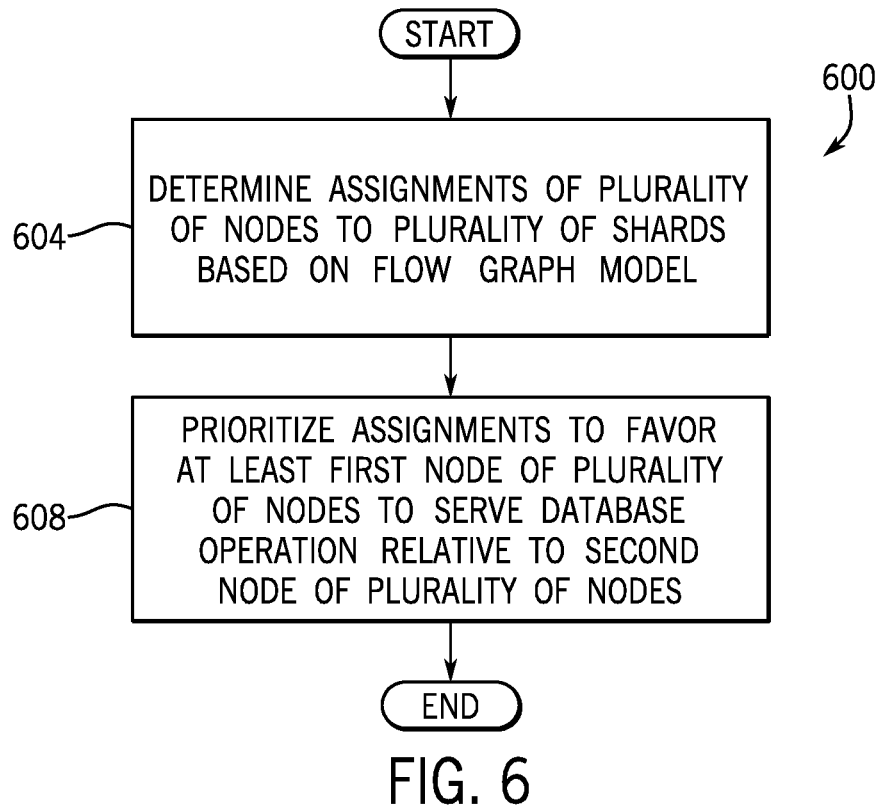

Thus, referring to FIG. 6 in conjunction with FIGS. 1 and 2, in accordance with example implementations, the node assignment engine 114 may perform a technique 600 that includes determining (block 604) assignments of a plurality of nodes to a plurality of shards based on a flow graph model. The technique includes prioritizing (block 608) the assignments to favor at least a first node of the plurality of nodes to serve a database operation relative to a second node of the plurality of nodes.

Figure 7:
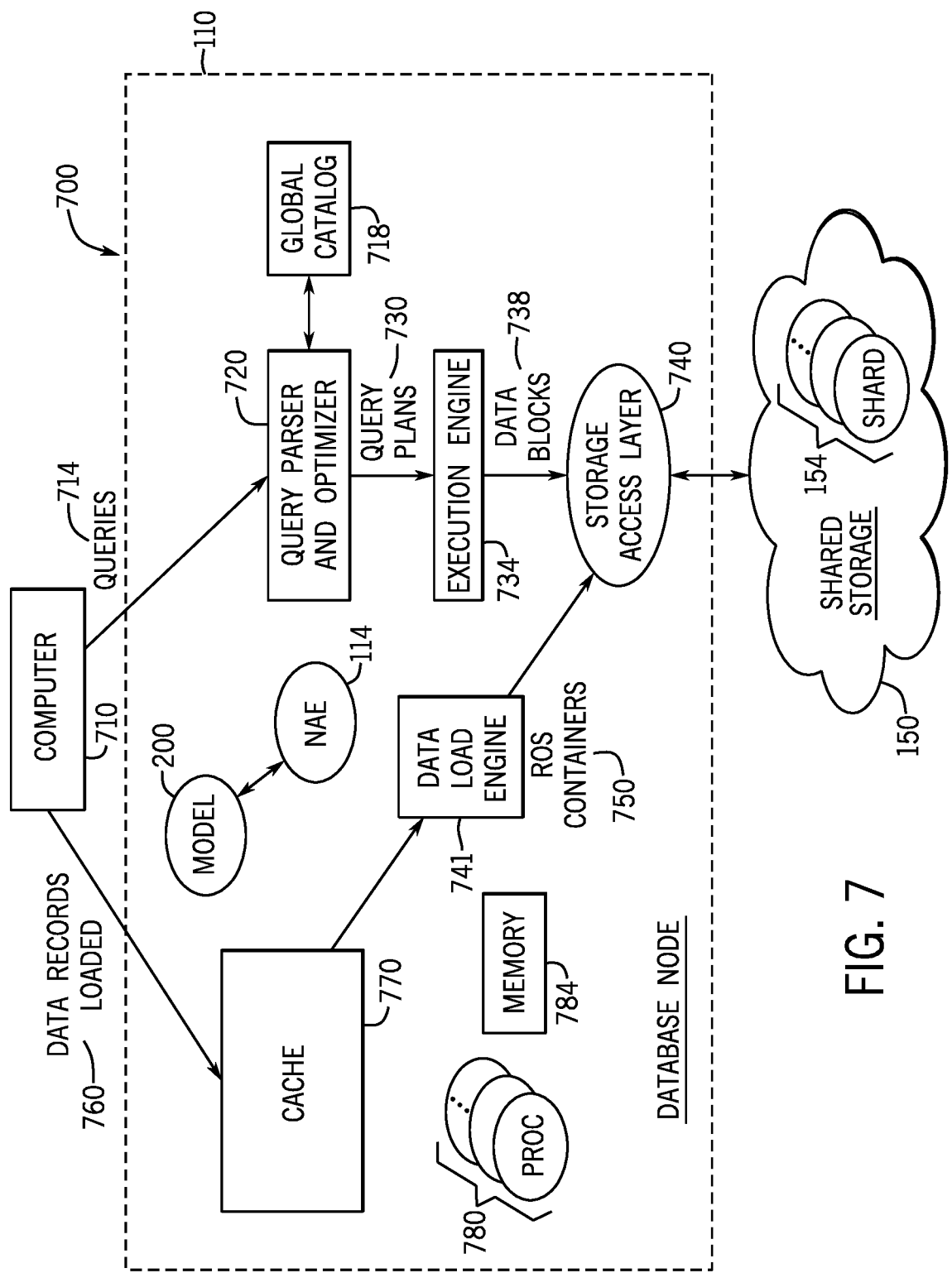
FIG. 7 is a schematic diagram of an example database environment according to an example implementation.

Referring to FIG. 7, in accordance with example implementations, a given node 110 may operate in an environment 700 as follows. In particular, the node 110 may receive data representing database operations that are submitted by one or multiple users through, for example, one or multiple computers 710. The computer 710 may communicate with the database system 100 via network fabric (not depicted in FIG. 7). For the example depicted in FIG. 7, the computer 710 may submit one or multiple queries 714 and one or multiple data records 760 in associated load operations to the database system 100.

The queries 714 may be, in accordance with example implementations, parsed by a query parser and optimizer 720 of the node 110. In general, the query parser and optimizer 720 may consult a global catalog 718 for purposes of determining whether the node 110 is to serve a given query. For the example implementation that is depicted in FIG. 7, the node assignment engine 114 is disposed on the node 110 and updates the global catalog 718 for purposes of assigning nodes to shards 154 to process a given query or, in accordance with example, for purposes of assigning nodes to shards for a given session.

The query parser and optimizer 720 develops a corresponding query plan 730 for a given query 714, which is provided to an execution engine 734 of the node 110. The execution engine 734, in turn, causes a storage access layer 740 of the node 110 to access the shared storage 105 and provide corresponding data blocks 738 back to the execution engine 734 in response to the executed query plan 730.

In accordance with example implementations, the node 110 may further include a write cache 770 that caches the data records 760 received by the node 110 associated with corresponding data load operations. Moreover, a data loading engine 774 of the node 110 may read data from the write cache 770 and rearrange the data into read optimized storage (ROS) containers 750 that form the shards 154 and are provided to the storage access layer 750 for purposes of storing the ROS containers 450 in the shared storage 105.

In accordance with example implementations, the node 110 may include one or multiple physical hardware processors 780, such as one or multiple central processing units (CPUs), one or multiple CPU cores, and so forth. Moreover, the node 110 may include a local memory 784. In general, the memory 784 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 784 may store various data (data representing parameters for the optimum flow graph analysis, data representing parameters used by the components of the node 110, and so forth) as well as instructions that, when executed by the processor(s) 780, cause the processor(s) 780 to form one or multiple components of the node, such as, for example, the node assignment engine 114, the query parser and optimizer 720, the execution engine 734, the storage access layer 740, the data loading engine 774, and so forth.

In accordance with example implementations, one or multiple components of the node 110 may be formed by dedicated hardware. For example, in accordance with example implementations, the node assignment engine 114 may be formed by dedicated hardware, such as a field programmable gate array (FPGA) or application specific integrated circuit (ASIC).

Figure 8:
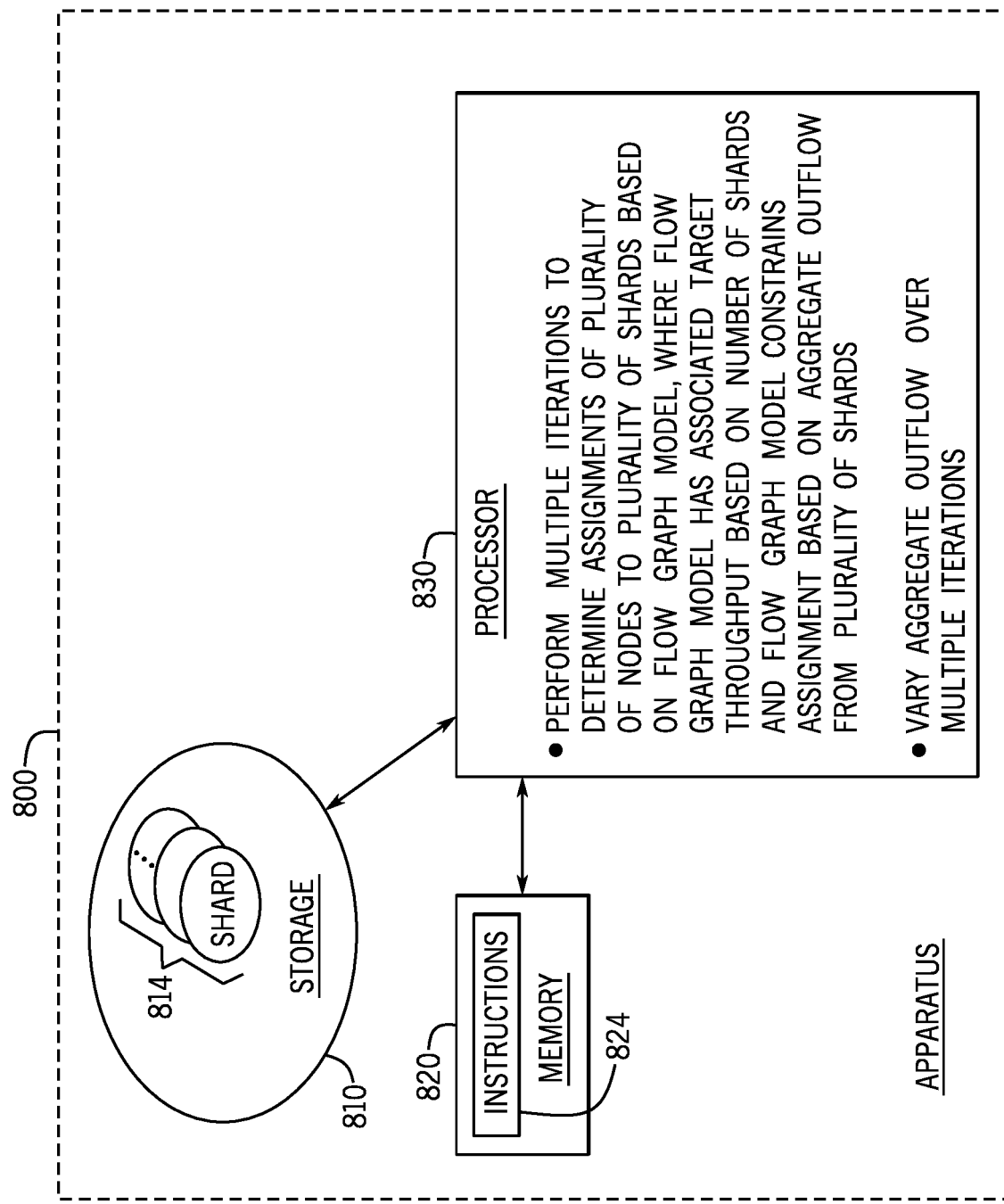
FIG. 8 is a schematic diagram of an apparatus according to an example implementation.

Referring to FIG. 8, in accordance with example implementations, an apparatus 800 includes a storage 810 to store shards 814. The apparatus includes a memory 820 to store instructions 824 that, when executed by a processor 830, causes the processor 830 to perform multiple iterations to determine assignments of a plurality of nodes to a plurality of shards based on a flow graph model. The flow graph model has an associated throughput based on a number of the shards, and the flow graph model constrains the assignments based on an aggregate outflow from the plurality of shards. The instructions 824, when executed by the processor 830, cause the processor 830 to vary the aggregate outflow over the multiple iterations.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
   determining, by a processor, a target throughput for a query directed to a plurality of shards based on a total number of the plurality of shards, wherein the target throughput is a target amount of query data being processed in a predetermined time unit;
   generating, by the processor, a flow graph model to be used to process the query, the flow graph model including a source vertex connected to shard vertices that represent the plurality of shards, the shard vertices connected to node vertices that represent a plurality of nodes that serve the plurality of shards, and the node vertices connected to a sink vertex via node-to-sink edges; and
   assigning the plurality of nodes to the plurality of shards based on the flow graph model, wherein the assigning comprises:
      performing a first iteration to determine a first set of assignments of the plurality of nodes to the plurality of shards based on the flow graph model, including assigning each of the node-to-sink edges of the flow graph model with a flow capacity such that an aggregate outflow of the first iteration from all of the node vertices to the sink vertex is less than the target throughput; and
      performing a second iteration to determine a second set of assignments of the plurality of nodes to the plurality of shards based on the first set of assignments, including increasing the flow capacity assigned to each of the node-to-sink edges such that an aggregate outflow of the second iteration is closer to the target throughput than the aggregate outflow of the first iteration is to the target throughput.

2. The method of claim 1, wherein the target throughput is proportional to the total number of the plurality of shards.

3. The method of claim 1, wherein the flow capacity assigned to each of the node-to-sink edges in the first iteration is equal to an integer quotient of the total number of the plurality of shards divided by a total number of the plurality of nodes.

4. The method of claim 1, wherein performing the first iteration comprises pseudo randomly or randomly determining an order in which the first set of assignments are determined.

5. The method of claim 1, wherein performing the first iteration comprises omitting a node of the plurality of nodes from the first set of assignments such that the omitted node is not assigned to any shard of the plurality of shards.

6. The method of claim 1, wherein performing the first iteration comprises prioritizing a sub-plurality of the plurality of nodes to favor at least a first node of the plurality of nodes to serve the query relative to a second node of the plurality of nodes.

7. The method of claim 1, wherein performing the first iteration comprises prioritizing a sub-plurality of the plurality of nodes to favor at least a first set of nodes of the plurality of nodes to serve the query.

8. The method of claim 7, wherein the first set of nodes comprises servers disposed on a physical rack shared in common among the nodes of the first set of nodes.

9. An article comprising a non-transitory computer readable storage medium storing instructions that when executed by at least one processor cause the at least one processor to:
   generate a flow graph model to be used to process a query, the flow graph model including a source vertex connected to shard vertices that represent a plurality of shards for the query, the shard vertices connected to node vertices that represent a plurality of nodes that serve the plurality of shards, and the node vertices connected to a sink vertex via node-to-sink edges; and
   model assignments of the plurality of nodes to the plurality of shards associated with a database operation based on the flow graph model and a target throughput for the plurality of nodes, wherein the target throughput is a target amount of query data being processed in a predetermined time unit, and wherein the instructions cause the at least one processor to:
      perform a first iteration to determine a first set of assignments of the plurality of nodes to the plurality of shards based on the flow graph model, including assigning each of the node-to-sink edges of the flow graph model with a flow capacity such that an aggregate outflow of the first iteration from the node vertices to the sink vertex is less than the target throughput, and
      perform a second iteration to determine a second set of assignments of the plurality of nodes to the plurality of shards based on the first set of assignments, including increasing the flow capacity assigned to each of the node-to-sink edges such that an aggregate outflow of the second iteration is closer to the target throughput than the aggregate outflow of the first iteration is to the target throughput.

10. The article of claim 9, wherein the non-transitory computer readable storage medium stores instructions that when executed by the at least one processor cause the at least one processor to model the target throughput as being proportional to a total number of the plurality of shards.

11. The article of claim 9, wherein the flow capacity assigned to each of the node-to-sink edges in the first iteration is equal to an integer quotient of a total number of the plurality of shards divided by a total number of the plurality of nodes.

12. The article of claim 9, wherein the non-transitory computer readable storage medium stores instructions that when executed by the at least one processor cause the at least one processor to prioritize the plurality of nodes to favor a first set of nodes that are installed in a same physical rack to serve the query.

13. The article of claim 9, wherein the non-transitory computer readable storage medium stores instructions that when executed by the at least one processor cause the at least one processor to assign priorities to the plurality of nodes and determine the first set of assignments based on the priorities.

14. The article of claim 13, wherein the non-transitory computer readable storage medium stores instructions that when executed by the at least one processor cause the at least one processor to prioritize the plurality of nodes based on bandwidths associated with node-to-node communications.

15. An apparatus comprising:
a storage to store a plurality of shards;
a processor; and
a memory to store instructions that, when executed by the processor, cause the processor to:
generate a flow graph model to be used to process a query, the flow graph model including a source vertex connected to shard vertices that represent the plurality of shards, the shard vertices connected to node vertices that represent a plurality of nodes that serve the plurality of shards, and the node vertices connected to a sink vertex via node-to-sink edges;
perform a first iteration to determine a first set of assignments of the plurality of nodes to the plurality of shards, including assigning each of the node-to-sink edges of the flow graph model with a flow capacity such that an aggregate outflow of the first iteration from the node vertices to the sink vertex is less than a target throughput, wherein the target throughput is a target amount of query data being processed in a predetermined time unit; and
perform a second iteration to determine a second set of assignments of the plurality of nodes to the plurality of shards based on the first set of assignments, including increasing the flow capacity assigned to each of the node-to-sink edges such that an aggregate outflow of the second iteration is closer to the target throughput than the aggregate outflow of the first iteration is to the target throughput.

16. The apparatus of claim 15, wherein the instructions, when executed by the processor, cause the processor to progressively increase the flow capacity assigned to each of the node-to-sink edges over additional iterations.

17. The apparatus of claim 16, wherein the flow capacity assigned to each of the node-to-sink edges is equal to an integer quotient of a total number of the plurality of shards divided by a total number of the plurality of nodes.

18. The apparatus of claim 15, wherein edges between the source vertex and the shard vertices in the flow graph model have a same flow capacity.

19. The apparatus of claim 15, wherein the instructions, when executed by the processor, cause the processor to maintain output flows from the plurality of nodes to be the same.

20. The apparatus of claim 15, wherein the instructions, when executed by the processor, cause the processor to prioritize the plurality of nodes based on a node-to-node communication bandwidth.

* * * * *